July 25, 1967 W. E. DURRWACHTER 3,333,173
SPLIT POLE ROTOR FOR SYNCHRONOUS MOTORS
Filed Feb. 26, 1965 2 Sheets-Sheet 1

INVENTOR.
WILLIAM E. DURRWACHTER
BY
ATTY.
AGENT 3,333,173
SPLIT POLE ROTOR FOR SYNCHRONOUS MOTORS
William E. Durrwachter, 1408 Oliver Ave., Annandale, Va. 22003
Filed Feb. 26, 1965, Ser. No. 435,751
13 Claims. (Cl. 318—191)

ABSTRACT OF THE DISCLOSURE

A synchronous motor having a plurality of rotor poles which are split into two legs. Each pole has a base winding fed with a fixed direct current and each leg has a winding, fed by a variable direct current, connected in series with the windings of the respective legs of the other poles. The magnetic center of the pole is varied by controlling the fields produced by the split winding thereby permitting load sharing with other motors.

---

The invention described herein may be manufactured and used by or for the Government of the United States of America for governmental purposes without the payment of any royalties thereon or therefor.

The present invention relates to synchronous motors and more particularly to a split pole rotor for synchronous motors wherein the magnetic center of the rotor poles may be varied in order to permit load sharing between parallel motors.

In the field of synchronous motors, it has been the general practice in order to permit the paralleling of synchronous motor generators, i.e., a synchronous motor driving a synchronous generator or to permit synchronous motors to share a common load, to use mechanical devices to achieve load sharing. The aforementioned mechanical devices include mechanical gear arrangements to shift a stator of the synchronous motor and mechanically varying the couplings on the shaft of the synchronous motor. Although such devices may serve the purpose, they have not proved satisfactory in all conditions of service in that the mechanical methods are cumbersome and increase costs, loads cannot be readily transferred from one machine to another by smooth transfer, that is, loads are dumped on and off of the motors, and the methods are slow and require precise mechanical alignment.

The general purpose of this invention is to provide all of the advantages of similarly employed motors and possesses none of the aforedescribed disadvantages. To obtain this, the present invention contemplates the use of a rotor with split poles having in addition to a base field coil an auxiliary coil on each leg of the split pole, wherein load sharing between synchronous motors can be achieved through simple non-mechanical means.

An object of the present invention is the provision of simple non-mechanical means to achieve load sharing between synchronous motors.

Another object is to provide a split pole rotor for synchronous motors.

A further object of the invention is the provision of a plurality of auxiliary coils on each split pole.

Still another object is to provide opposing auxiliary coils on each split pole to permit the magnetic center of the pole face to be varied.

A still further object is the provision of a motor control system to permit load sharing between paralleled synchronous motors.

Other objects and many of the attendant advantages of this invention will be readily appreciated as the same becomes better understood in reference to the following detailed description when considered in connection with the accompanying drawings in which like reference numerals designate like parts throughout the figures thereof and wherein.

Figure 1:
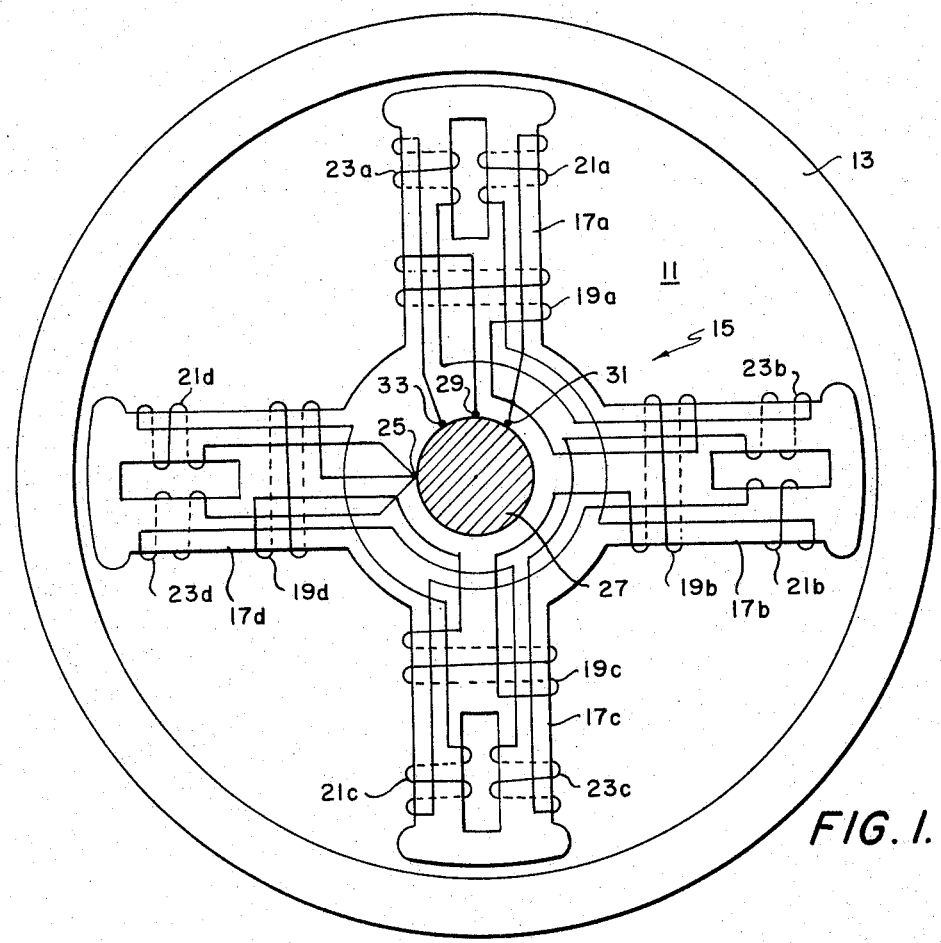
FIG. 1 shows a partly diagrammatic view of a synchronous motor constructed according to the principles of the present invention having a split pole rotor and a plurality of coils.
Figure 2:
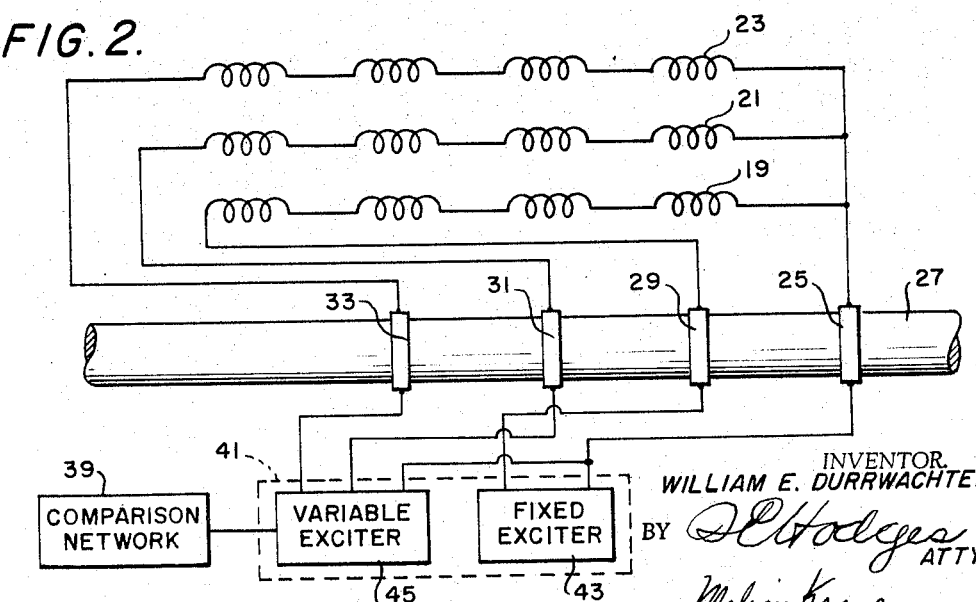
FIG. 2 is a schematic diagram of the circuit connection of the coils on the split pole rotor.

Referring now to the drawings, there is shown in FIG. 1 (which illustrates a preferred embodiment) a four pole synchronous motor 11 of the present invention, including a stator 13 (shown conventionally) and a rotor 15. The rotor is shown having a plurality of split poles 17a to 17d and three sets of coils on each pole. Each set of coils is series connected as shown in FIG. 2. The coils include a base field coil 19a to 19d, an auxiliary coil 21a to 21d on one leg of each split pole and another auxiliary coil 23a to 23d on the other leg of each split pole. Each set of coils is connected to a common slip ring 25 shown in FIG. 2 riding on shaft 27, and to its respective slip ring 29, 31 and 33 also riding on shaft 27.

In the normal operation of a conventional synchronous motor, a polyphase current is supplied through the stator winding which produces a rotating magnetic field at the stator and a direct current is supplied to a base rotor coil, thus producing a fixed polarity at each pole. The rotor rotates with the rotating magnetic field of the stator and when loads are applied, the base field coil is varied to produce more or less flux thereby varying the power factor of the motor. The amount of variation in the strength of the base field coil is limited in that a large variation may cause the motor to lose synchronism.

In accordance with the present invention the base field coil 19 is supplied with a fixed direct current thus producing a fixed polarity at each pole. A variable direct current is applied to the auxiliary coils 21 and 23 on each leg of the poles, which by varying the strength of the field produced on each coil, or by using one of the coils in a bucking mode permits the magnetic center of the pole face to be shifted in relation to the rotating field of the stator without greatly effecting the magnitude of the flux between the rotor and the stator. By shifting of the magnetic center of the pole face, the torque of the synchronous motor may be increased thereby allowing the motor to take a greater load without varying the power factor, since the flux between the rotor and the stator remains substantially constant. Therefore, through the use of simple non-mechanical means, that is, by electrically controlling the relative position of the rotor poles, the synchronous motors can be made to share load to any degree between them and loads may be smoothly transferred between motors.

Figure 3:
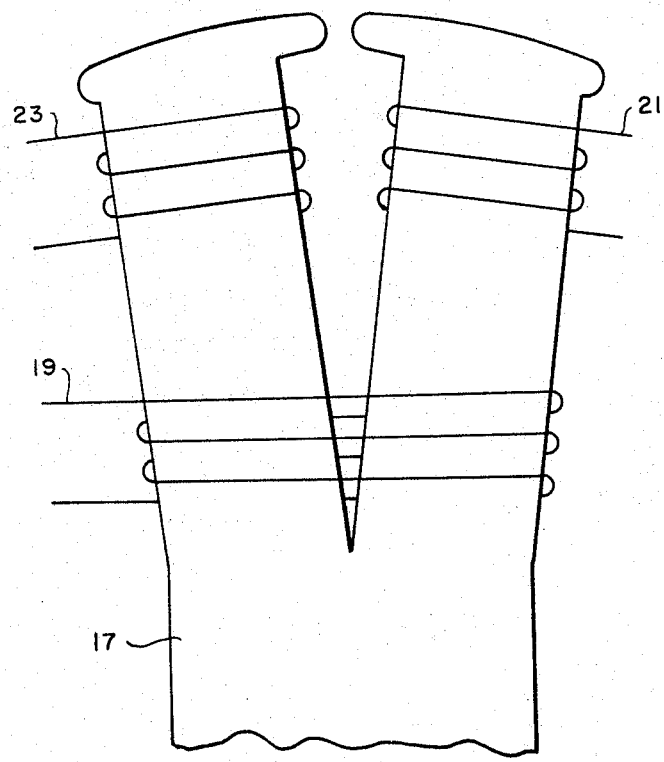
FIG. 3 illustrates a modification of a split pole design for the synchronous motor.

Another split pole design is shown in FIG. 3 wherein the opening in the pole face permits easier winding of the auxiliary coils about the legs of the split pole. It is also to be noted that other possible coil configurations include the use of a coil on only one leg of the split pole in addition to the base of the field coil, which coil may be used in either buck or boosting mode, and the use of a coil on each leg of the pole without the base field coil wherein the coils would control the amount of flux between the rotor and the stator and in addition by varying the strength of the fields created by each of the coils, shift the pole face in relation to the rotating magnetic field of the stator.

Figure 4:
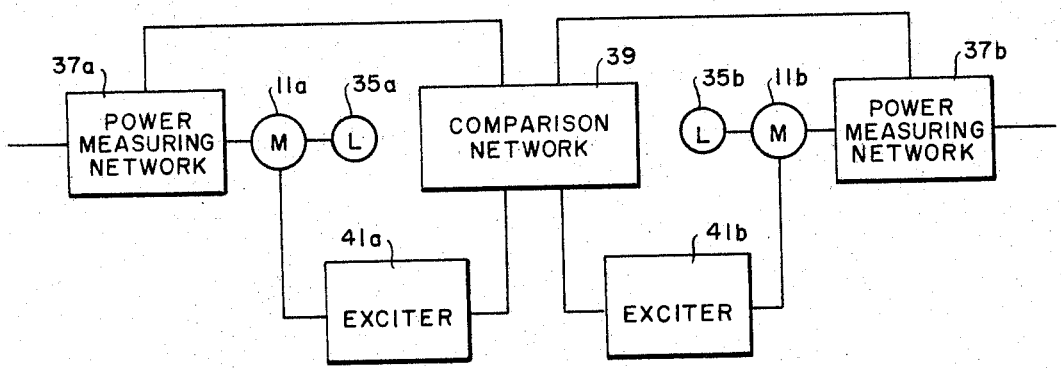
FIG. 4 illustrates in block diagram form a motor control system using the present invention.

For purposes of illustration and not by way of limitation, FIG. 4 illustrates one of the many motor control systems which can be used for controlling the field strength of the rotor winding and thus achieve load sharing between motors. A synchronous motor 11a is paralleled with another synchronous motor 11b to share a common load shown conventionally as load 35a and 35b. In order for the motors to share a load, a means must be provided for determining the loading magnitude of each motor and controlling the torque of each motor to achieve load sharing. The determination of the loading may be accomplished as shown in FIG. 4. Conventional power measuring network 37a and 37b such as a discriminator circuit shown in FIG. 27–2 on page 458 of "Magnetic Amplifiers" by H. F. Storm, 1955, is electrically connected at the input to the respective motor senses the loading on the respective motor and feeds a signal indicative of this loading to a comparison network 39. A suitable comparison network circuit is illustrated in "Magnetic Amplifiers" by H. F. Storm, 1955, page 436, FIG. 26–5, wherein a signal indicative of the difference in loading is fed to exciter 41a or 41b depending upon which motor is to be controlled. The illustrated comparison circuit is modified as would be obvious to one with ordinary skill in the art, to provide for the output of applicant's disclosed power measuring network by providing dual opposed windings in each saturable reactor wherein the output from network 37a feeds one saturable reactor and the output from network 37b feeds the other saturable reactor.

The exciter 41 which controls the amount of current supplied to the rotor coils as shown in FIG. 2 may include a fixed exciter 43 which control the strength of the base field coil and a variable exciter 45 having two outputs 47 and 49. The output of the comparison circuit control the outputs 47 and 49 and output 47 controls the strength of the coil 21 through slip ring 31 and output 49 controls the strength of coil 23 through slip ring 33. A suitable variable exciter may be in the form of two circuits of the type of circuit shown in "Magnetic Amplifier" by H. F. Storm, 1955, page 436, FIG. 26–5, connected together in a parallel arrangement with their input polarities reversed. The parallel arrangement of the circuits provides one circuit with an output that increases while the output from the other circuit decreases. In this manner the field strength of one coil is increased while the field strength of the other decreased, thereby insuring close control over the shifting of the magnetic center of the pole face in relation to the rotating magnetic field of the stator. The exciter controlling the other motor is of course the same circuit as disclosed by applicant with its input polarity from the comparison network being reversed so as to operate in opposition to the control affected by the other exciter. The fixed exciter may be in the form of a direct current source with a manual control. It is also noted that the controlling of the motor loading may be achieved by a manual control without the need for the control system as aforedescribed.

Obviously many modifications and variation of the present invention are possible in the light of the above teachings. It is therefore to be understood that within the scope of the appended claims the invention may be practiced otherwise than as specifically described.

What is claimed is:

1. A synchronous motor comprising:
a stator energized by a polyphase current to produce a rotating magnetic field;
a rotor having a plurality of split poles;
each of said poles having a first and a second leg;
a base field coil wound about each of said poles and connected together in series;
a first coil wound about said first leg of each of said poles and connected together in series;
a second coil wound about said second leg of each of said poles and connected together in series; and
exciter means electrically connected to said base field coil for energizing said base field coil to produce a fixed polarity at each pole and electrically connected to said first and second coils for energizing said coils to vary the field strength of said coils whereby the magnetic center of said split poles are shifted in relation to the rotating field of the stator.

2. A synchronous motor comprising:
a stator energized by a polyphase current to produce a rotating magnetic field;
a rotor having a plurality of split poles;
each of said poles having a first and a second leg;
a base field coil wound about each of said poles and connected together in series;
fixed exciter means electrically connected to said base field coil for energizing said coil to produce a fixed polarity at each pole;
a first coil wound about said first leg of each of said poles, each of said first coils being connected together in series; and
variable direct current exciter means electrically connected to said first coil for energizing said first coil to vary the field strength of said coil, whereby the magnetic center of said split poles are shifted in relation to the rotating field of the stator.

3. A synchronous motor according to claim 2 but further comprising:
a second coil wound about said second leg of each of said poles and connected together in series; and
said variable exciter means electrically connected to said second coil for energizing said first and second coils to vary the field strength of said coils whereby the magnetic center of said poles are shifted in relation to the rotating field of the stator.

4. A synchronous motor according to claim 3 wherein said fixed exciter means and said variable exciter means delievers a direct current energizing current through said coils.

5. A synchronous motor according to claim 3 wherein said first and said second leg of each split pole is joined together to form a solid pole face.

6. A synchronous motor according to claim 3 wherein said first and said second coils are energized to produce opposing fields, thereby insuring close control over the shifting of the magnetic center of the pole in a relation to the rotating field of the stator.

7. A synchronous motor comprising:
a stator energized by a polyphase current to produce a rotating magnetic field;
a rotor having a plurality of split poles;
each of said poles having a first and a second leg;
a first coil wound about said first leg of each of said poles and connected together in series;
a second coil wound about said second leg of each of said poles and connected together in series; and
direct current exciter means electrically connected to said first and second coils for energizing said first and second coils to produce a fixed polarity at each pole and in addition cause the field strength of said coils to vary whereby the magnetic center of said poles are shifted in relation to the rotating field of the stator.

8. A system to permit load sharing between parallel synchronous motors comprising:
a plurality of synchronous motors connected together in parallel, wherein each of said motors comprises;
a stator energized by a polyphase current to produce a rotating magnetic field;
a rotor having a plurality of split poles;
each of said poles having a first and second leg;
a base field coil wound about each of said poles and connected together in series;
a first coil wound about said first leg of each pole and connected together in series;
exciter means connected to said base field coil and to said first coil for energizing said base field coil to produce a fixed polarity at each pole and for energizing said first coil to vary the field strength of said coil whereby the magnetic center of said poles are shifted in relation to the rotating field of the stator;

a load common to each of said motors;

power measuring means connected to each of said motors for sensing the loading on each motor and providing an output indicative of said loading;

means electrically connected to said power measuring means for comparing the loading on each motor and providing a signal indicative of the difference in the loading;

said difference signal being fed to said exciter means whereby said exciter means energizes said first coil to produce a shifting of the magnetic center of the poles, thereby permitting the synchronous motors to share the common load.

9. A system to permit load sharing between parallel synchronous motors according to claim 8 wherein each of said synchronous motors further comprising:

a second coil wound about said second leg of each of said poles and connected together in series; and said exciter means electrically connected to said second coil for energizing said first and second coils to vary the field strength of said coils whereby the magnetic center of said poles are shifted in relation to the rotating field of the stator.

10. The system according to claim 9 wherein said first and said second coils are energized to produce opposing fields, thereby insuring close control over the shifting of the magnetic center of the poles in relation to the rotating field of the stator.

11. The system according to claim 9 wherein said exciter means comprises:

a fixed exciter means electrically connected to said base field coil for energizing said coil to produce a fixed polarity at each pole;

variable exciter means electrically connected to said first and second coils for energizing said coils to vary the field strength of said coils, whereby the magnetic center of said split poles are shifted in relation to the rotating field of the stator; and said exciter means delivering a direct current energizing current through said coils.

12. A system according to claim 9 wherein said first and said second leg of each split pole is joined together to form a solid pole face.

13. The system to permit load sharing between parallel synchronous motors comprising:

a plurality of synchronous motors connected together in parallel, wherein each of said motors comprises;

a stator energized by a polyphase current to produce a rotating magnetic field;

a rotor having a plurality of split poles;

each of said poles having a first and a second leg;

a first coil wound about said first leg of each of said poles and connected together in series;

a second coil wound about said second leg of each of said poles and connected together in series;

exciter means electrically connected to said first and second coils for energizing said first and second coils to produce a fixed polarity at each pole and in addition cause the field strength of said coils to vary, whereby the magnetic center of said poles are shifted in relation to the rotating field of the stator;

a load common to each of said motors;

power measuring means connected to each of said motors for sensing the loading on each motor and providing an output indicative of said loading;

means electrically connected to said power measuring means for comparing the loading on each motor and providing a signal indicative of the difference in the loading;

said difference signal being fed to said exciter means whereby said exciter means energizes said first and second coils to produce a shifting of the magnetic center of the poles thereby permitting the synchronous motors to share the common load.

References Cited

UNITED STATES PATENTS

| 1,804,606 | 5/1931 | Grau | 318—100 X |
| 2,864,040 | 12/1958 | Trotsky | 318—99 X |
| 2,939,069 | 5/1960 | Dvoracek | 210—187 X |

FOREIGN PATENTS

| 18,280 | 5/1912 | Great Britain. |

BENJAMIN DOBECK, *Primary Examiner.*

G. Z. RUBINSON, *Assistant Examiner.*